July 5, 1938. T. DE W. RIVERS 2,122,952
BRAKE EQUALIZER
Filed June 23, 1936
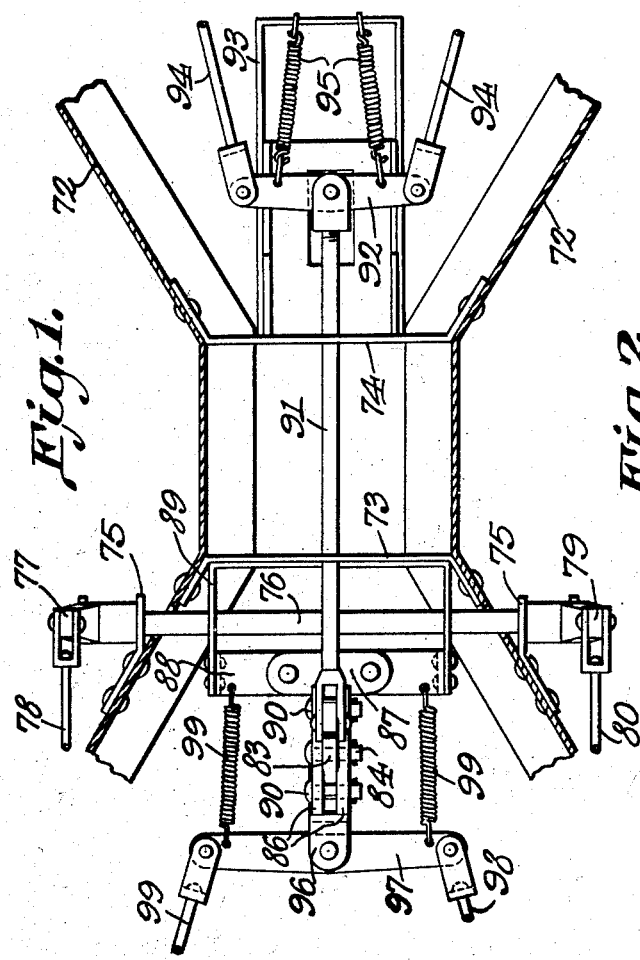
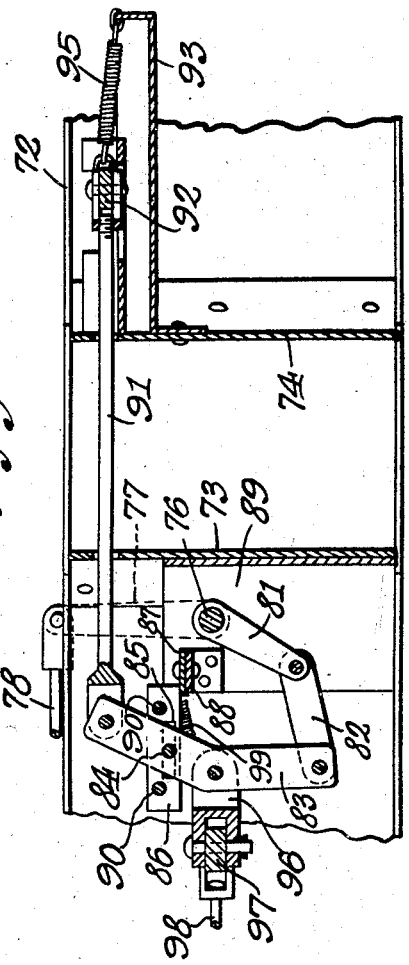
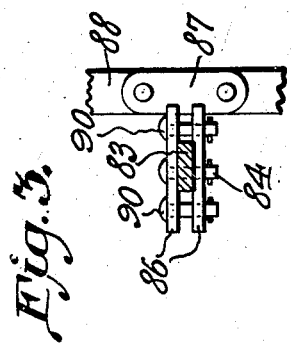
Inventor
Thomas D. Rivers
By C. A. Snow & Co.
Attorneys Patented July 5, 1938

2,122,952

UNITED STATES PATENT OFFICE 2,122,952

BRAKE EQUALIZER

Thomas De Witt Rivers, Portsmouth, Va.

Application June 23, 1936, Serial No. 86,839

1 Claim. (Cl. 188—204)

The device forming the subject matter of this application is a brake, and the invention aims to provide novel means whereby, through the instrumentality of a novel arrangement of levers, an equalization of the braking effort may be brought about. The invention aims to provide novel means under the control of an operator for actuating the brake, to provide novel spring means for controlling parts of the device, and, generally, to supply an equalizing means which will be simple but effective.

It is within the province of the disclosure to improve generally and to enhance the utility of devices of that type to which the invention pertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawing:

Fig. 1 is a horizontal section showing the invention;

Fig. 2 is a vertical section of the device shown in Fig. 1;

Fig. 3 is a fragmental top plan showing the mounting for one of the levers.

Referring to the drawing the vehicle frame bars 72 form part of a housing and are connected by a transverse front plate 73 and a transverse back plate 74. There are bearings 75 on the bars 72. A first shaft 76 is journaled in the bearings 75. The shaft carries at one end an arm 77, and to the arm is pivoted a connection 78 adapted to be joined to a hand brake lever (not shown). At the opposite end of the shaft 76 there is an arm 79 to which a connection 80 is pivoted. The connection 80 is joined to any suitable actuating means (not shown).

Intermediate its ends, the shaft 76 is supplied with a depending arm 81. Links 82 connect the arm 81 with a vertical first lever 83. The lever 83 carries intermediate its ends a guide bolt 84 or the like, movable transversely in an elongated slot 85 formed in the side portions 86 of a bracket 87 secured to a cross bar 88 connected to the sides of an extension 89 projecting forwardly from the front plate 73 of the housing 80. The lever 83 operates between safety bolts 90, mounted in the sides 86 of the bracket 87 and located at the ends of the slot 85 which receives the bolt 84 of the lever 83.

A rearwardly extended connecting rod 91 is pivoted at its forward end to the upper end of the lever 83 and passes slidably through the housing plates 73 and 74. A second lever 92 is fulcrumed intermediate its ends on the rear end of the rod 91. The second lever 92 is slidably supported on a rearwardly prolonged extension 93, attached to the rear plate 74. Connections 94 are pivoted to the ends of the second lever 92 and are adapted to be joined to rear brake mechanisms (not shown). Pull springs 95 are connected to the lever 92, on opposite sides of its fulcrum, and to the rear end of the housing extension 93.

A forwardly extended link 96 is provided, and the lever 83 is fulcrumed intermediate its ends upon the link, below the guide bolt 84 of the lever. A third lever 97 is fulcrumed intermediate its ends on the link 96, and, like the lever 92, operates transversely of the lever 83. Connections 98 are pivoted to the ends of the lever 97 and are adapted to be joined to forward brake actuating devices (not shown). Pull springs 99 are anchored at their rear ends to the cross bar 88 of the housing and are connected at their forward ends to the lever 97 on opposite sides of its fulcrum.

The shaft 76 is rocked by the arm 77 and the connection 78, or by the arm 79 and the connection 80. The arm 81 and the link 82 tilt the lever 83 on its fulcrum connection with the part 96, and the rod 91, together with the lever 92 and the connections 94, set the rear brakes. The lever 83, the link 96, the lever 97 and the connections 98 actuate the front brake. Equalization is afforded because the levers 83, 92 and 97 are fulcrumed intermediate their ends on the parts that carry them.

Having thus described the invention, what is claimed is:

A brake equalizer comprising a housing, a guide carried by the housing, a shaft journaled in the housing, means under the control of an operator for actuating the shaft, a first lever provided with a part which has movement in the guide in a direction transverse to the axis of the shaft, a second lever, means for connecting the second lever fulcrumwise and intermediate its ends to one end of the first lever, brake connections assembled with the ends of the second lever, a third lever, means for fulcruming the first lever intermediate its ends on the third lever, brake connections assembled with the ends of the third lever, an arm on the shaft, and means for connecting the arm with the opposite end of the first lever.

THOMAS DE WITT RIVERS.